March 10, 1931.　　　G. E. ALMQUIST　　　1,796,182
HOT PLATE
Original Filed Feb. 27, 1929
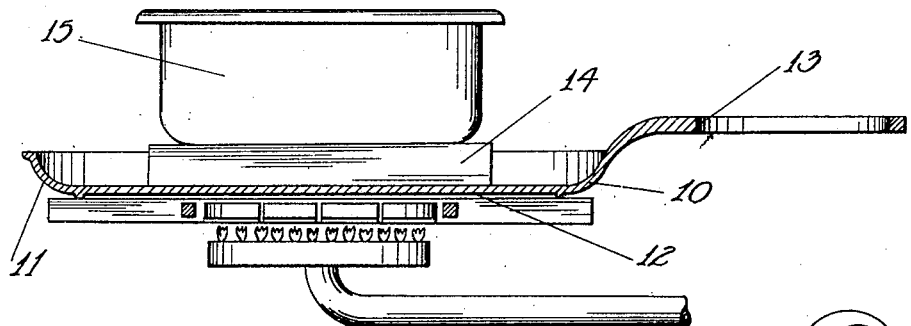
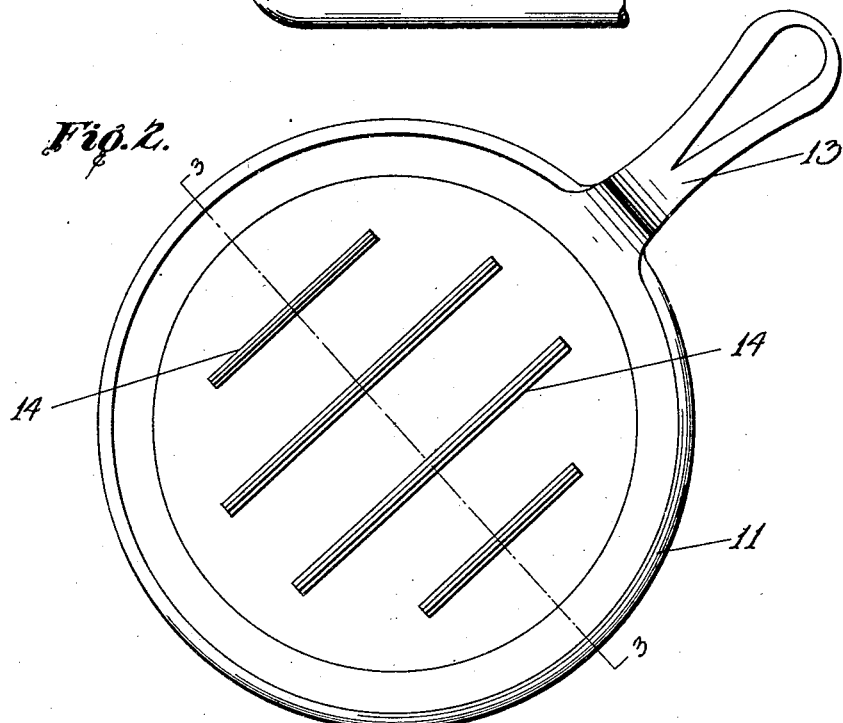
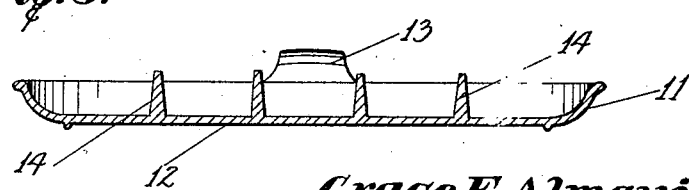
Grace E. Almquist
INVENTOR
BY Victor J. Evans
ATTORNEY Patented Mar. 10, 1931

1,796,182

UNITED STATES PATENT OFFICE

GRACE E. ALMQUIST, OF LA PORTE, TEXAS

HOT PLATE

Application filed February 27, 1929, Serial No. 343,022. Renewed August 14, 1930.

This invention relates to new and useful improvements in hot plates.

An object of the invention comprehends the provision of a receptacle.

Another object of the invention consists of supporting elements arranged within the receptacle to space the bottom of a cooking vessel therefrom.

More specifically stated the supporting elements project for appreciable distances above the periphery of the receptacle to facilitate the circulation of air beneath the cooking vessel.

With the above and other objects in view, the invention further consists of the following novel features and details of construction, to be hereinafter more fully described, illustrated in the accompanying drawing and pointed out in the appended claim.

In the drawing:—

Figure 1 is a longitudinal sectional view taken through the receptacle and illustrating the arrangement of the supporting elements therein to space the bottom of a cooking vessel from the adjacent portion of the receptacle.

Figure 2 is a top plan view of the invention.

Figure 3 is a transverse sectional view taken on line 3—3 of Figure 2.

Referring to the drawing in detail wherein like characters of reference denote corresponding parts, the reference character 10 indicates generally a receptacle having a relatively short annular side wall 11 and outwardly flared circumferentially of the bottom 12 of the receptacle. A handle 13 for the receptacle is preferably formed upon and projected from the periphery of the side wall 11 in the manner shown in Figure 1 of the drawing.

The supporting elements, as mentioned in the foregoing, and as indicated at 14, of cross section V-shaped formation and of elongated contour, are arranged in spaced parallelism upon the upper side of the bottom 12 of the receptacle. As manifest from the illustrations of my invention in Figures 1 and 3 of the drawing, the apices of the supporting elements or fins 14 project for appreciable distances upwardly and beyond the peripheral edge of the side wall 11. Said fins or supporting elements also fall short of extending the distances between the opposed portions of the side wall within the receptacle as shown in Figure 2 of the drawing. A cooking or other vessel, such as indicated at 15, seated upon the uppermost projecting portions of the supporting elements or fins 14 in the manner shown in Figure 1 of the drawing will elevate and space the bottom thereof from contacting engagement with the bottom of the receptacle 10 whereby the contents of said vessel will not stick to the bottom thereof and burn.

The present invention was primarily designed to replace the customary double boiler to keep food from burning or scorching.

By reason of the fact that the apices of the supporting elements or fins 14 project upwardly for appreciable distances beyond the periphery of the receptacle, unrestricted circulation of air beneath the bottom of the cooking vessel will be facilitated. In the event any of the contents of the vessel boils over or overflows, the wall 11 will catch and retain the overflow whereby the fire from the burner, beneath the receptacle, will not be put out and the orifices therefor will not be clogged incident to the drying out of the heated food therein.

The invention is susceptible of various changes in its form, proportions and minor details of construction, and the right is herein reserved to make such changes as properly fall within the scope of the appended claim.

Having thus described the invention, what is claimed is:—

The combination of a flat bottomed receptacle having a relatively shallow side wall outwardly flared from the bottom therefor, of supporting ribs of elongated contour carried by and arranged in spaced parallelism upon the upper side of the receptacle bottom, and said ribs being of V-shape in cross section and having the apices thereof projecting upwardly for appreciable distances beyond the periphery of the side wall for said receptacle.

In testimony whereof, I affix my signature.

GRACE E. ALMQUIST.